(12) United States Patent
Hori et al.

(10) Patent No.: US 6,359,696 B1
(45) Date of Patent: *Mar. 19, 2002

(54) PARALLEL PRINT AND PAPER FEED CONTROL METHOD AND APPARATUS, AND COMPUTER READABLE STORAGE MEDUIM STORING PROGRAM FOR REALIZING THE METHOD

(75) Inventors: Kenjiro Hori, Tokorozawa; Tetsuo Kishida; Koichi Suzuki, both of Toride, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/933,291

(22) Filed: Sep. 18, 1997

(30) Foreign Application Priority Data

Sep. 19, 1996 (JP) ................................................ 8-248095

(51) Int. Cl.⁷ ................................................ B41B 1/00
(52) U.S. Cl. ........................................ 358/1.13; 399/16
(58) Field of Search ................................ 395/101, 102, 395/105, 106, 109, 111, 112, 114; 358/401, 409, 437, 501, 1.1, 1.2, 1.5, 1.6, 1.9, 1.12, 1.13, 1.15; 347/4, 5, 44, 124, 181, 182; 399/16, 19, 24, 68, 136

(56) References Cited

U.S. PATENT DOCUMENTS

| | | | |
|---|---|---|---|
| 4,712,118 A | 12/1987 | Seto et al. .................. 346/108 |
| 4,751,394 A | 6/1988 | Matsuoka et al. .......... 250/561 |
| 4,761,662 A | 8/1988 | Yoshimoto et al. ......... 346/108 |
| 4,870,432 A * | 9/1989 | Maeda et al. ................. 347/66 |
| 4,935,615 A | 6/1990 | Eiichi et al. ................. 250/205 |
| 5,051,010 A * | 9/1991 | Stephens et al. ............. 400/194 |
| 5,058,037 A * | 10/1991 | Kageyama et al. ......... 395/116 |
| 5,121,162 A * | 6/1992 | Iwamoto ...................... 399/82 |
| 5,146,579 A * | 9/1992 | Nakano ....................... 714/38 |
| 5,418,603 A * | 5/1995 | Kusumoto et al. ............ 399/16 |
| 5,512,929 A * | 4/1996 | Serizawa et al. ........... 347/153 |
| 5,701,182 A | 12/1997 | Hori et al. .................. 358/296 |

* cited by examiner

Primary Examiner—Gabriel I. Garcia
(74) Attorney, Agent, or Firm—Fitzpatrick, Cella, Harper & Scinto (57) ABSTRACT

A print control apparatus includes an interface controller, a counter, a paper feed controller, and a print controller. The controllers operate in parallel in accordance with a value of the counter and a status of a paper sheet. The number of print instruction or instructions from an external device is counted by the counter, and, if the value counted by the counter is not "0" and if a printing apparatus is ready for feeding a paper sheet, the paper feed controller initiates picking up a paper sheet from a paper feed cassette and conveying it. In turn, the value counted by the counter is decreased by 1. When the print controller detects that the paper sheet is conveyed to a printing position, the paper sheet is printed. The external device can inquire regarding the current value of the counter as well as instruct the decrease or clearance of the value of the counter. Thereby, the external device can know the number of printings to be performed and/or erase a print instruction or instructions which have been outputted to the printing apparatus.

28 Claims, 8 Drawing Sheets

STORAGE MEDIUM ( e.g. ,FD / CD - ROM )

| DIRECTORY INFORMATION |
|---|
| GROUP OF PROGRAM CODES CORRESPONDING TO STEPS OF FLOWCHART IN FIG. 3 |
| GROUP OF PROGRAM CODES CORRESPONDING TO STEPS OF FLOWCHART IN FIG. 4 |
| GROUP OF PROGRAM CODES CORRESPONDING TO STEPS OF FLOWCHART IN FIG. 5 |
| GROUP OF PROGRAM CODES CORRESPONDING TO STEPS OF FLOWCHART IN FIG. 6 |
| GROUP OF PROGRAM CODES CORRESPONDING TO STEPS OF FLOWCHART IN FIG. 7 |
| GROUP OF PROGRAM CODES CORRESPONDING TO STEPS OF FLOWCHART IN FIG. 8 |
|  |

MEMORY MAP OF STORAGE MEDIUM

PARALLEL PRINT AND PAPER FEED CONTROL METHOD AND APPARATUS, AND COMPUTER READABLE STORAGE MEDUIM STORING PROGRAM FOR REALIZING THE METHOD

BACKGROUND OF THE INVENTION

The present invention relates to a print control method and apparatus controlling print processing performed in an image forming unit on the basis of a print instruction and print data inputted from an external device, and a computer readable storage medium storing a program realizing the method.

Recently, page printers, such as a laser beam printer and an LED printer, have an advantage of printing a high-resolution image on plain paper, and have become widely accepted on the market. Further, the sizes of paper sheets used for printing widely ranges from A5 size to A3 size.

In order that a page printer can print on various sizes of paper sheets, a plurality of paper holding units (paper feed cassettes) which respectively store paper sheets of different sizes are provided, and an image forming unit of the page printer prints on a paper sheet fed from one of the plurality of paper holding units.

In this case, a user designates the size of a paper sheet to be used for printing to the printer from an external device, and the printer feeds a paper sheet from one of the plurality of paper holding units which corresponds to the designated size, then performs print processing. If there is no paper holding unit for holding paper sheets of the size designated from the external device, the user has to change a paper sheet holding unit which is not currently used into a paper sheet holding unit which holds paper sheets of the desired size. Such troublesome work for changing paper holding units may be omitted by providing as many paper holding units for different sizes of paper sheets as they may be used for printing.

However, as the number of the paper holding units increases, the size of the printer increases accordingly. Furthermore, by increasing the number of paper holding units, the volume occupied by the paper holding units with respect to the overall size of the printer also increases, which lengthens a conveyance path of a paper sheet from each of the paper sheet holding unit to the printing position where printing is performed on the paper sheet by the image forming unit.

In addition, since the conveyance path is lengthened, in order to increase the throughput, paper feed operation for the next page needs to be performed while printing a preceding page.

Further, when the distance from the paper sheet holding unit to the printing position is far longer than the length of the paper sheet in the conveyance direction, in order to achieve a desired throughput, paper sheets to be used to print a few pages later have to be fed while printing a page.

As described above, by increasing the number of paper holding units, the distances from the paper holding units to the printing position are lengthened. As a result, while a printing apparatus is printing a page, an image processing apparatus (a host computer or an apparatus for controlling the printing apparatus) which sends image signals to the printing apparatus has to designate the paper to be used for printing print data of a few pages in advance.

Consequently, interfacing control between the image processing apparatus and the printing apparatus becomes complicated. For example, as many paper feed instructions (or paper feed designation signals) as there are paper sheets that can be placed between the paper sheet holding units and the printing position have to be prepared in advance, and the image processing apparatus has to send each paper feed instruction (or each paper feed designation signal) to the printing apparatus at proper timing while the printing apparatus is printing a page.

Further, normally, the image processing apparatus has to receive an acknowledge status or an acknowledge signal corresponding to each paper feed instruction for confirming whether or not the paper feed instruction is accepted by the printing apparatus. Furthermore, the image processing apparatus has to check which acknowledge corresponds to which paper feed instruction. Thus, the above control is very complicated.

SUMMARY OF THE INVENTION

The present invention has been made in consideration of the above situation, and has as its object to provide a print control method and apparatus capable of designating paper feed operation in advance to a printing apparatus in a simple manner without putting extra load on communication control of an external device and the print control apparatus, and a computer readable storage medium storing a program realizing the method.

It is still another object of the present invention to provide a print control method and apparatus capable of realizing high-throughput print processing while confirming a transition state of a printing apparatus in response to a paper feed instruction sent in advance, and a computer readable storage medium storing a program realizing the method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
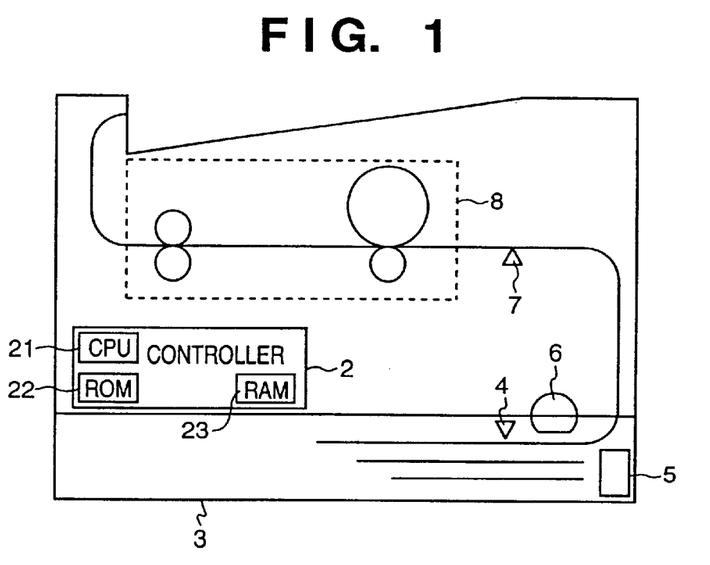
FIG. 1 is a cross sectional view for explaining a brief configuration of a printing apparatus according to a first embodiment of the present invention.

FIG. 1 is a cross sectional view for explaining a brief configuration of a printing apparatus, e.g., a laser beam printer, according to a first embodiment of the present invention.

In FIG. 1, reference numeral 1 denotes a main body of the printing apparatus, such as a laser beam printer; 2, a controller, including CPU 21, ROM 22, RAM 23, which controls respective units collectively; 3, a paper feed cassette in which paper sheets of a predetermined size are stored; 4, a sensor which detects whether or not there is a paper sheet in the paper feed cassette 3, and notifies the CPU 21 in the controller 2 of the detected result; 5, a sheet size detector which detects the size of the paper sheets stored in the paper feed cassette 3, and sends a signal indicative of the size of the paper sheets to the CPU 21 in the controller 2; 6, a paper feed roller which picks up a paper sheet stored in the paper feed cassette 3 and sends it to a conveyance path; 7, a state sensor which monitors conveyance state of the paper sheet, detects and signals the front and trailing edges of the paper sheet, where a detection signal is used for generating start timing of forming an image; and 8, an image forming unit, so-called a printer engine, for executing known electrophotographic processing.

Figure 2:
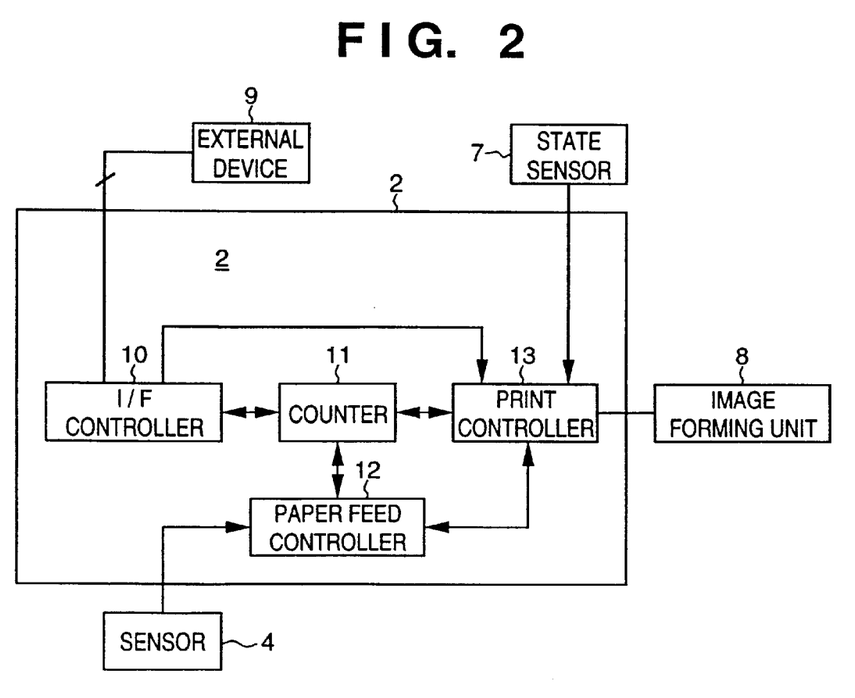
FIG. 2 is a block diagram illustrating a configuration of a controller of the printing apparatus according to the first embodiment of the present invention.

FIG. 2 is a block diagram illustrating a configuration of the controller 2 of the printing apparatus according to the first embodiment of the present invention.

In FIG. 2, reference numeral 10 denotes an interface (I/F) controller which accepts instructions, such as a print instruction, from an external device 9, such as a host computer, designates when to perform print processing to a print controller 13, and notifies of the state of the printing apparatus 1 to the external device 9; and 11, a counter which counts the number of accepted print instruction or instructions, and keeps the counted value. Note, the value of the counter 11 is set to "0" when the printer 1 is turned on. Further, reference numeral 12 denotes a paper feed controller which performs paper feed control and monitors the state of paper sheets in the paper feed cassette 3, e.g., whether or not there is a paper sheet and the size of the paper sheet or sheets stored in the paper feed cassette 3; and 13, the print controller which controls print processing performed by the image forming unit 8 on a conveyed paper sheet.

Figure 3:
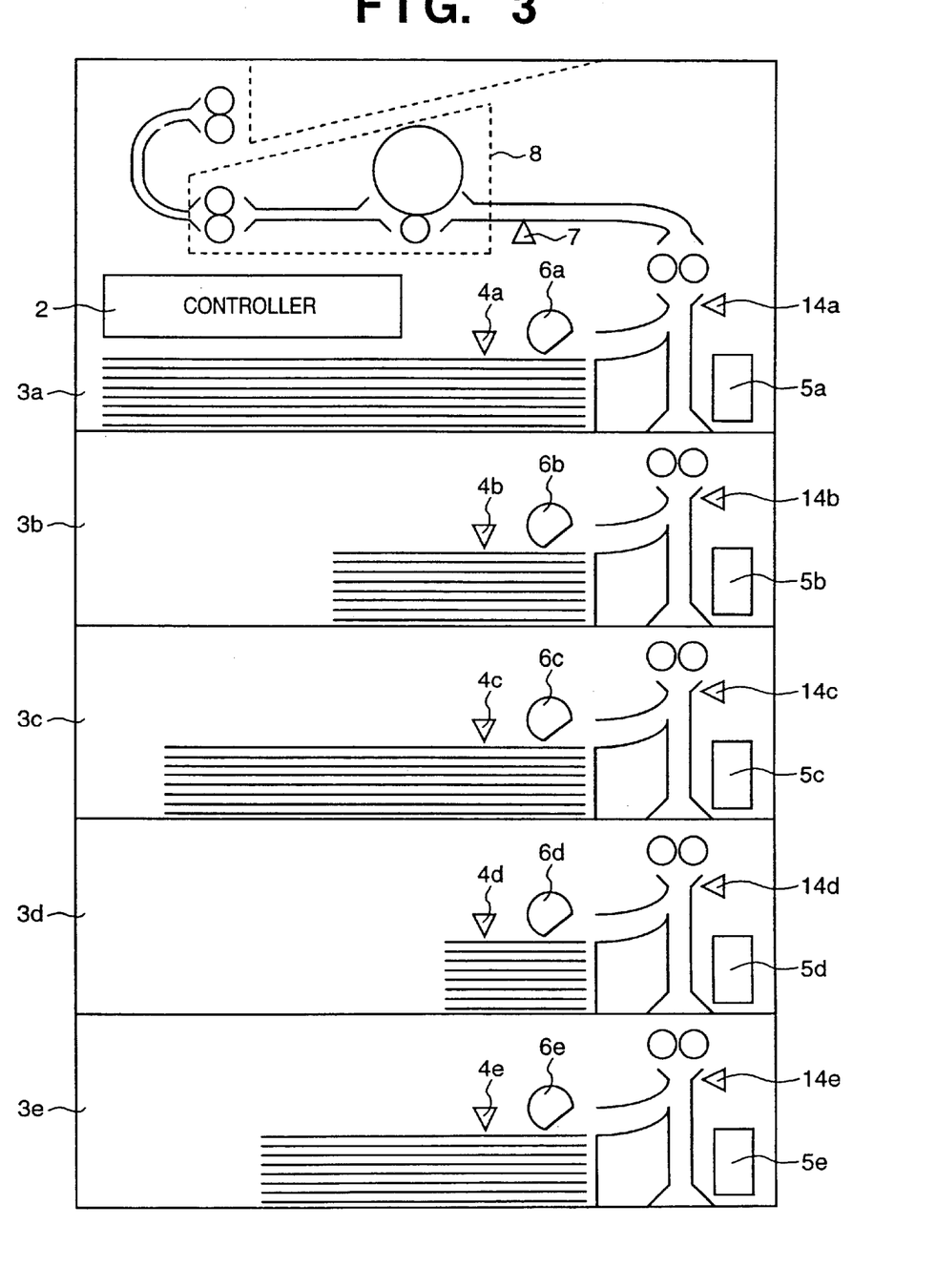
FIG. 3 is a cross sectional view for explaining another example of a printing apparatus provided with multiple paper feed cassettes according to the first embodiment of the present invention.

FIG. 3 is a cross sectional view showing a configuration of another printing apparatus including multiple paper feed cassettes 3a to 3e according to the embodiment.

Referring to FIG. 3, sensors 4a to 4e function as the sensor 4 in FIGS. 1 and 2, sheet size detectors 5a to 5e function as the sheet size detector 5 in FIG. 1 for each respective sheet size, and paper feed rollers 6a to 6e function as the paper feed roller 6 in FIG. 1 for each respective sheet size. Further, reference numerals 14a to 14e denote sensors for detecting whether or not there are paper sheets in the respective conveyance paths.

Next, the first embodiment of the present invention will be explained.

The controller 2 controls print processing performed by the image forming unit 8 on the basis of a print instruction and print data inputted from the external device 9 via a predetermined communication medium (interface or network). The I/F controller 10 receives print instructions and print data inputted from the external device 9, and the counter 11 counts the number of print instruction or instructions inputted from the external device 9. The print controller 13 controls the image forming unit 8 to print on a conveyed paper sheet the same number of times as that of print instruction or instructions counted by the counter 11. Further, the counter 11 counts and stores the number of print instruction or instructions inputted from the external device 9 while the image forming unit 8 is printing; therefore, the print controller 13 controls the image forming unit 8 to print on the same number of conveyed paper sheets as the stored number of print instruction or instructions. At the same time, the I/F controller 10 informs the external device 9 of the stored number of print instruction or instructions in the counter 11 as each print instruction is executed; therefore, the external device 9 can recognize a remaining number of instruction or instructions and a number of paper sheet or sheets to be printed. Furthermore, even while the printing apparatus 1 is printing a given page, the external device 9 is able to easily designate paper feed instructions for feeding a plurality of paper sheets to be used for printing the subsequent pages. Accordingly, print processing with optimized throughput is realized by a simple designation.

Further, since a state of acceptance of a print instruction is informed to the external device 9, the external device 9 can confirm the responsive state of the printing apparatus 1 to the print instruction.

Further, the value of the counter 11 is decreased each time a recording medium is conveyed to the image formation unit 8, or each time image forming on a recording medium starts by the image forming unit 8. Accordingly, the external device 9 can confirm the progress of print processing by the printing apparatus 1 performed in response to a print instruction designated by the external device 9.

Furthermore, it is possible for the external device 9 to confirm that the printing apparatus 1 is actually conveying a paper sheet in response to the print instruction or the printing apparatus 1 is actually printing on the conveyed paper sheet.

Figure 4:
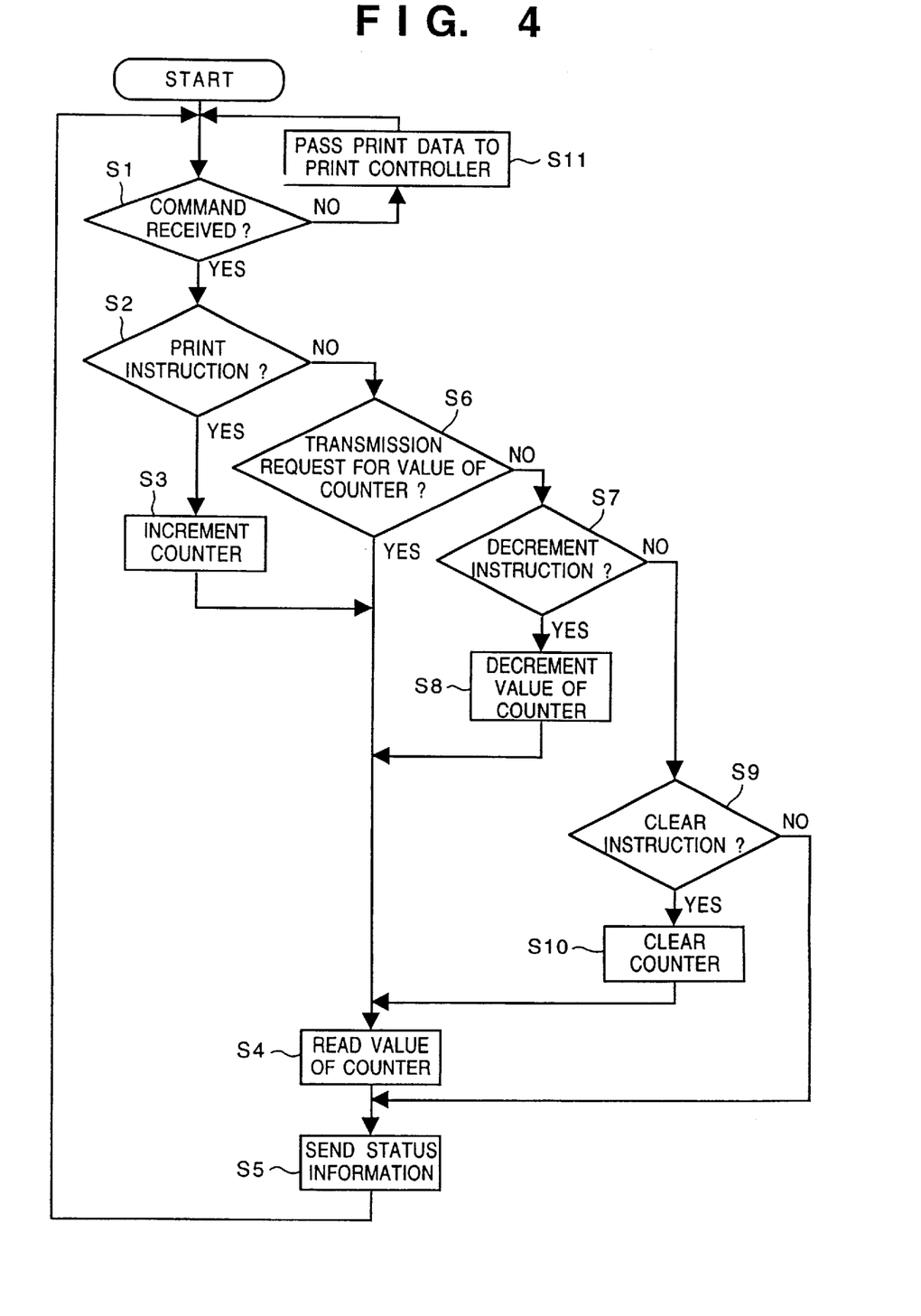
FIG. 4 is a flowchart of an operational sequence by an interface controller of the printing apparatus according to the first embodiment of the present invention.

FIG. 4 is a flowchart of an operational sequence of the I/F controller 10 of the printing apparatus 1 according to the first embodiment of the present invention. Note, exchange of information between the external device 9 and the printing apparatus 1 is performed in the following manner in the first embodiment; first, the external device 9 sends a command to the printing apparatus 1, and when the printing apparatus 1 receives the command, status information corresponding to the content of the command is returned to the external device 9.

When the printing apparatus 1 is turned on and becomes ready to exchange information with the external device 9, control operation by the I/F controller 10 begins. First in step S1, the I/F controller 10 waits for a command or data sent from the external device 9. If it is a command, the process proceeds to step S2, where the I/F controller 10 analyzes the content of the command and determines whether or not the command is a print instruction, in order to proceed to processing corresponding to the instruction. If the received command is a print instruction, then the process proceeds to step S3, and the value of the counter 11 is increased by 1. Thereafter, the process proceeds to step S4, where the I/F controller 10 reads the value of the counter 11 and sends the value to the external device 9 as status information (step S5).

Here, the paper feed controller 12 and the print controller 13, both shown in FIG. 2, monitor the value of the counter 11, and when the value changes to any value other than "0", the paper feed controller 12 starts controlling the paper feed operation from the paper feed cassette 3 (or one of the paper feed cassettes 3a to 3e) and the print controller 13 starts controlling the print processing on the fed paper sheet. Each control process will be explained later in detail.

Further, the external device 9 can instruct to print the same image on a plurality of paper sheets successively by transmitting the same number of print instructions as a desired number of the paper sheets to be printed. Further, the external device 9 transmits a print instruction at an arbitrary time whenever print processing is desired to be performed.

If it is determined in step S2 that the command received by the I/F controller 10 is not a print instruction, then the process proceeds to step S6, where whether or not the command is a transmission request for the value of the counter 11 is determined. If it is, then the process proceeds to step S4 where the current value of the counter 11 is read, and in step S5, the read value is transmitted to the external device 9 as status information.

Accordingly, if the external device 9 has transmitted a print instruction or instructions and the number of unprocessed pages to be printed is wanted, the external device 9 can obtain the number of unprocessed pages to be printed by using this command.

Whereas, if the command is not for requesting the value of the counter 11, the process proceeds to step S7, where whether or not the command is a decrease instruction for decreasing the value of the counter 11 by 1 is determined. If it is, the process proceeds to step S8 where the value of the counter 11 is decreased by 1, then goes to step S4. Note, when the value of the counter 11 is "0", the value is not changed.

Accordingly, when cancellation of a print instruction for a page among a plurality of instructions issued by the external device 9 is desired, the print instruction is canceled by transmitting this command.

Whereas, when it is determined in step S7 that the command is not a decrease instruction, then the process proceeds to step S9 and whether or not the command received by the I/F controller 10 is a clear instruction is checked. If it is, the process proceeds to step S10 where the value of the counter 11 is cleared to "0", then proceeds to step S4, and the value of the counter 11 is read, and the counted value "0" is transmitted to the external device 9 as status information, similarly to the aforesaid cases.

Thus, the external device 9 can cancel all the print instruction or instructions which have been transmitted to the printing apparatus 1 by transmitting the clear instruction.

Whereas, if the command is a command other than above, the process proceeds to step S5, where whether it is a command for inquiring a state, such as a state whether or not there is a paper sheet on the paper feed cassette and paper sheet size, or not is determined, and the printing apparatus 1 responds to the external device 9 with status information corresponding to the command.

Note, if a command is not received in step S1, namely, when print data is received, the process proceeds to step S11 and the I/F controller 10 passes the received data to the print controller 13.

Next, the control operation of the paper feed controller 12 according to the first embodiment is explained with reference to flowcharts in FIGS. 5 and 6. Note, the paper feed controller 12 performs the processes shown in FIGS. 5 and 6 in parallel to the processes shown in FIG. 4.

Figure 5:
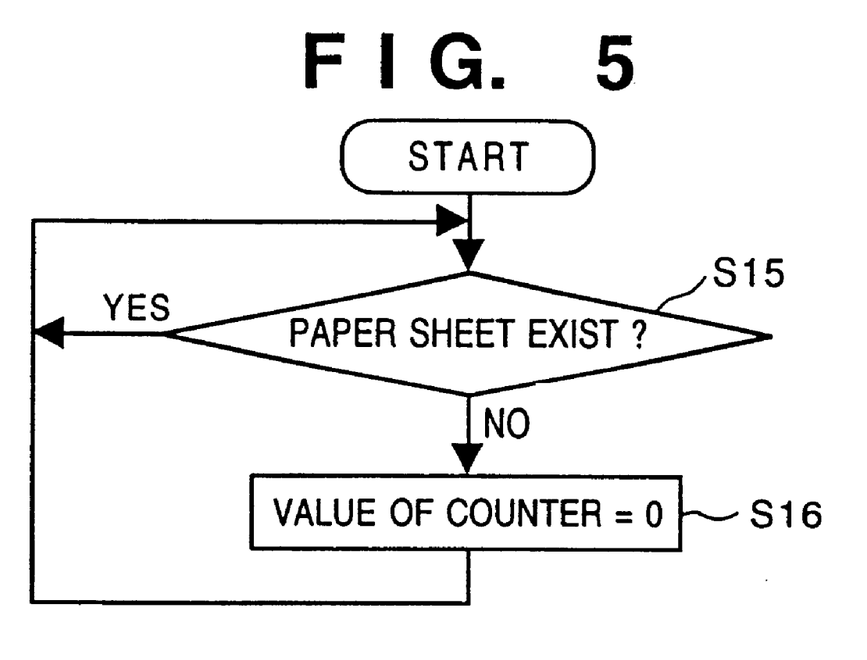
FIG. 5 is a flowchart of an operational sequence of a paper feed controller according to the first embodiment of the present invention.

FIG. 5 is a flowchart of the operational sequence of the paper feed controller 12 according to the first embodiment of the present invention.

First in step S15, whether or not there is a paper sheet in the paper feed cassette 3 which is currently used for printing is determined on the basis of a signal from the sensor 4 corresponding to the paper feed cassette 3. If it is determined that there is no paper sheet of the size to be used in the printing operation, then the process proceeds to step S16, and the value of the counter 11 is cleared to "0".

Figure 6:
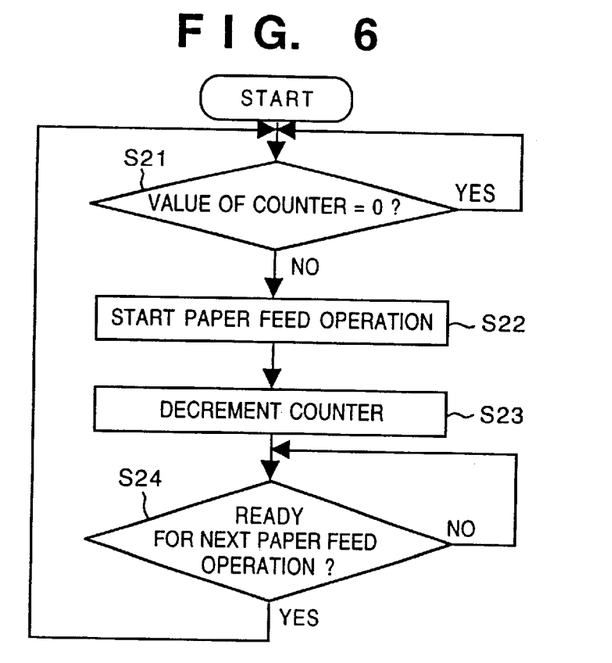
FIG. 6 is a flowchart of an operational sequence of the paper feed controller according to the first embodiment of the present invention.

FIG. 6 is a flowchart of an operational sequence of the paper feed controller 12 according to the first embodiment of the present invention.

When initialization of the printing apparatus 1 is completed after the printing apparatus is turned on, the control processing shown in FIG. 6 starts. First in step S21, whether or not the value of the counter 11 is "0" is checked. If it is not, then it means that there is a print instruction, thus the process moves to step S22, and the paper feed roller 6 is controlled to rotate, thereby starting paper feed operation. Next in step S23, the value of the counter 11 is decreased by 1. In step S24, the fed paper sheet is conveyed, and the process waits until the printing apparatus 1 becomes a state in which the next paper sheet can be fed and conveyed. A concrete example of the process in the step S24 is as follows. Until the sensor 14, corresponding to the paper feed cassette to be used for the printing, stops sensing existence of any paper sheet on the conveyance path of a paper sheet, then the process returns to step S21. As another example of the step S24, there is a way to determine for the next paper sheet to be able to be fed at the time corresponding to the length of a preceding paper sheet has elapsed after start of feeding of the preceding paper sheet.

Note, if the printing apparatus has the configuration as described in FIG. 3, print instructions from an external device 9 include the paper sheet size for the printing, and are stored into a memory (e.g. FIFO) in an order of receipt of the print instructions. The stored print instructions are read out of the memory and the corresponding printing is performed in order. Further, until the printing using paper sheets of a predetermined size has been completed, printing using paper sheets of other sizes is prohibited.

Figure 7:
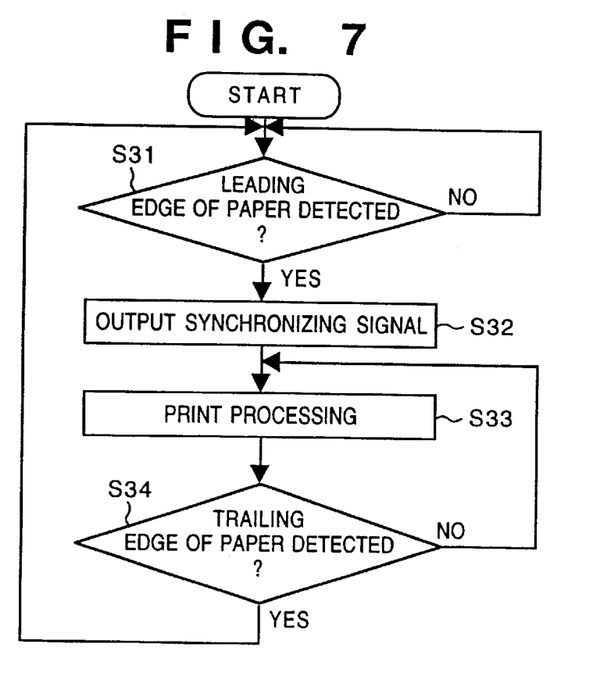
FIG. 7 is a flowchart of an operational sequence of a print controller according to the first embodiment of the present invention.

FIG. 7 is a flowchart of an operational sequence of the print controller 13 according to the first embodiment of the present invention.

This process starts after the printing apparatus 1 is turned on and initialized, and is performed in parallel with the processes shown in FIGS. 4 to 6. First in step S31, detection of the leading edge of a paper sheet by the state sensor 7 starts, and when the leading edge of a conveyed paper sheet is detected, the process moves to step S32. In step S32, a synchronizing signal used for establishing synchronization with start time of image formation is outputted, and print processing is performed by the image forming unit 8 (step S33). The print processing continues until the state sensor 7 detects the trailing edge of the paper sheet used for the printing in step S34. Then, when the trailing edge of the paper sheet is detected in step S34, the process proceeds to step S31, and the state sensor 7 is ready for detecting the leading edge of the next paper sheet. Note, in step S32, the value of the counter 11 may be transmitted to the external device 9.

By configuring the printing apparatus 1 having a long conveyance path or paths from a paper feed position or positions of the paper feed cassette 3 or of the paper feed cassettes 3a to 3e to a printing position of the image forming unit 8 as described above, high-throughput print processing can be performed by issuing multiple print instructions, because each controller 10, 12 and 13 can perform the processes shown in FIGS. 4, 5 and 6, respectively, in parallel in accordance with the value of counter 11 and the status of the fed paper.

Further, by decreasing the value of the counter 11 which corresponds to the paper feed cassette currently used at the same time that feeding a paper sheet starts, the external device 9 is able to easily confirm that a paper sheet used for printing is fed in response to a print instruction issued by the external device 9.

In the first embodiment, when no paper sheet is in the paper feed cassette 3 or one of the paper feed cassettes 3a to 3e which is to be used for the printing, the counter 11 or the corresponding one of the counters (11) is cleared to "0". However, the time to clear the counter 11 to "0" is not limited to the above, and the counter 11 may be cleared when a print error, such as jamming, occurs. Further, the value of the counter 11 can be cleared to "0" by using a clear instruction from the external device 9; it is not necessary to clear the value or values of the counter 11 to "0" when no paper sheet is in the desired paper feed cassette.

Furthermore, in the printing apparatus having the configuration shown in FIG. 1, the paper feed controller 12 monitors whether or not there is paper in the paper feed cassette 3, and, when no paper sheet is in the paper feed cassette 3, the counter 11 is cleared to "0". However, the counter 11 may be cleared when the size of the paper sheets is changed, e.g., in a case where a paper feed cassette holding A4-sized paper sheets is replaced by a paper feed cassette holding A5-sized paper sheets, which is detected on the basis of information from the sheet size detector 5.

Figure 10:
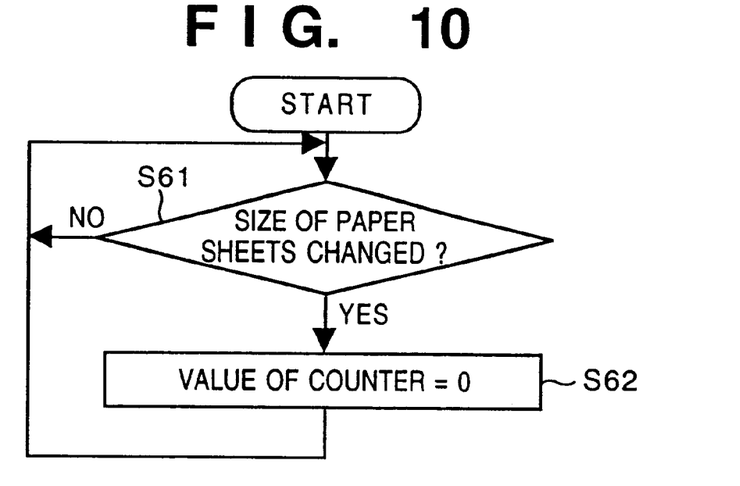
FIG. 10 is a flowchart of an operational sequence of the paper feed controller according to the first embodiment.

The case described in the above paragraph is shown in a flowchart in FIG. 10, and the processing is performed instead of the processing shown in the flowchart in FIG. 5. First in step S61, whether the size of the paper sheets of the paper feed cassette 3 is changed or not is detected (the paper feed cassette is exchanged to a different cassette accommodating a different size of paper sheets), and if it is, the process proceeds to step S62, where the value of the counter 11 is cleared to "0".

Accordingly, the counter 11 is not cleared when only the condition that no paper sheet is in the paper feed cassette is satisfied; therefore, when paper sheets of the same size are supplied, printing operation may start immediately. In contrast, when another paper feed cassette 3 holding paper sheets of a different size is mounted, the counter 11 is cleared and printing operation is not performed; thereby it is possible to prevent printing on a paper sheet of undesired size.

Note, by providing a plurality of counters for the respective paper feed cassettes of the apparatus shown in FIG. 3, as described above with reference to FIGS. 4 and 5, it is possible to perform the processing shown in FIG. 10 based on states of the respective paper feed cassettes.

<Second Embodiment>

A second embodiment of the present invention is explained below. Note, a configuration of a print control apparatus is the same as that of the above first embodiment, and the explanation of it is omitted.

Figure 8:
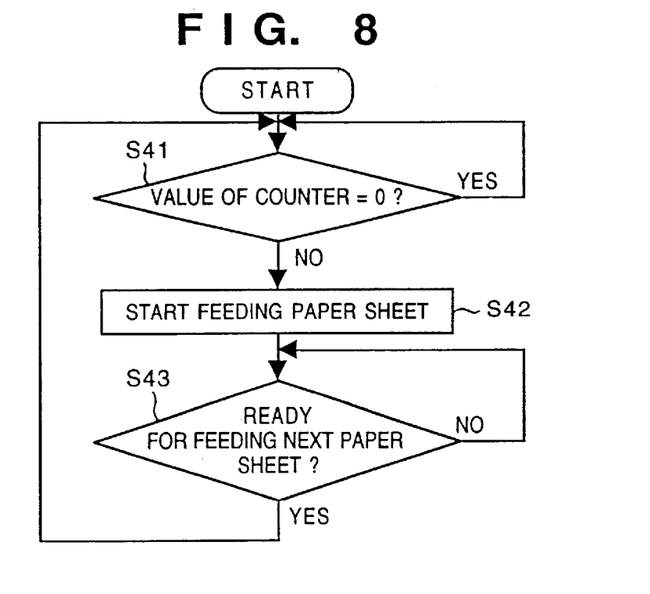
FIG. 8 is a flowchart of an operational sequence of the paper feed controller according to a second embodiment of the present invention.

FIG. 8 is a flowchart of a control sequence of the paper feed controller 12 of the printing apparatus 1 according to the second embodiment of the present invention. The sequence is performed in parallel with the processes in FIG. 4.

This processing starts after the printing apparatus 1 is turned on and initialized. First in step S41, whether or not the value of the counter 11 is "0" is checked. If it is not "0", then it indicates that there is an unprocessed print instruction, therefore, the process proceeds to step S42 where a paper sheet is fed by driving the paper feed roller 6. Next, the process proceeds to step S43, where the paper sheet which is fed in step S42 is conveyed. Then the paper feed controller 12 waits until the printing apparatus 1 is ready for feeding and conveying the next paper sheet, thereafter, the process returns to step S41. The difference between the processing shown in FIG. 8 and the one shown in the flowchart in FIG. 6 explained in the first embodiment is that there is no process, in FIG. 8, to decrease the counter by 1 performed in step S33 in FIG. 6.

Figure 9:
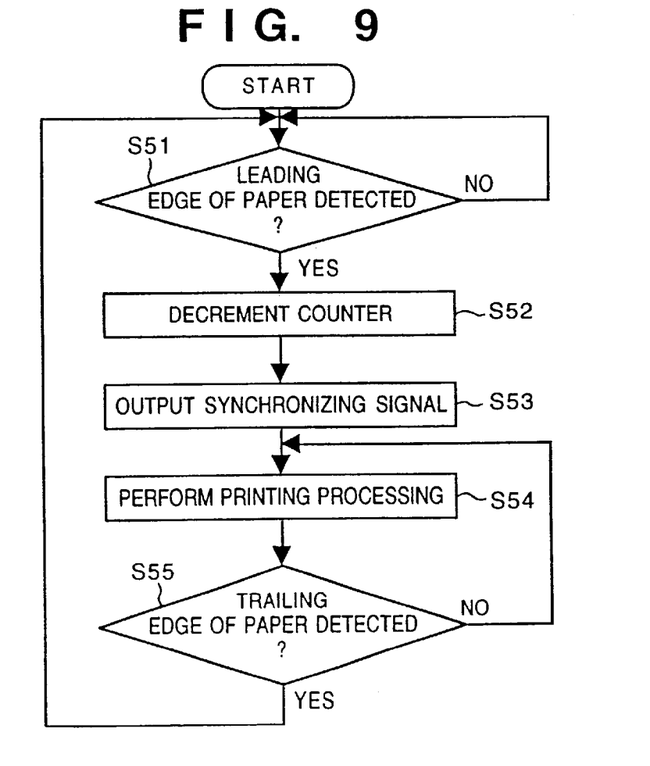
FIG. 9 is a flowchart of an operational sequence of the print controller according to the second embodiment of the present invention.

FIG. 9 is a flowchart of a control sequence of the print controller 13 of the printing apparatus 1 according to the second embodiment of the present invention. The sequence is performed in parallel with the processes shown in FIGS. 4 and 8.

First in step S51, whether or not the state sensor 7 detected the leading edge of a conveyed paper sheet is checked, and if it is, the process moves to step S52, where the value of the counter 11 is decreased by 1. Next the process proceeds to step S53, where a synchronizing signal used for establishing synchronization with start time for forming an image is outputted. Thereafter, print processing is performed by the image forming unit 8 in step S54. This print processing is continued until the state sensor 7 detects the trailing edge of the paper sheet in step S55. When the trailing edge of the paper sheet is detected, the process returns to step S51, and detection of the leading edge of the next paper sheet starts. Note, in step S53, the value of the counter 11 may be outputted to the external device 9.

Accordingly, in a printer having a long conveyance path from the start position of paper feeding to the image forming unit 8, high-speed printing is realized only by issuing multiple print instructions, because each controller 10, 12 and 13 can perform the processes shown in FIGS. 4, 5 and 6, respectively, in parallel in accordance with the value of counter 11 and the status of the fed paper.

Further, by decreasing the value of the counter 11 by 1 when the image forming processing starts, not when a paper sheet starts to feed, it is possible to easily confirm the number of unprocessed page or pages which correspond to the number of print instructions, outputted by the external device 9, which are not yet executed.

Note, a plurality of counters may be provided to the respective paper feed cassettes of the apparatus shown in FIG. 3, as described above with reference to FIGS. 6 and 7, so that it is possible to perform control on the basis of a value of one of the counters which corresponds to the paper feed cassette used for printing.

Figure 11:
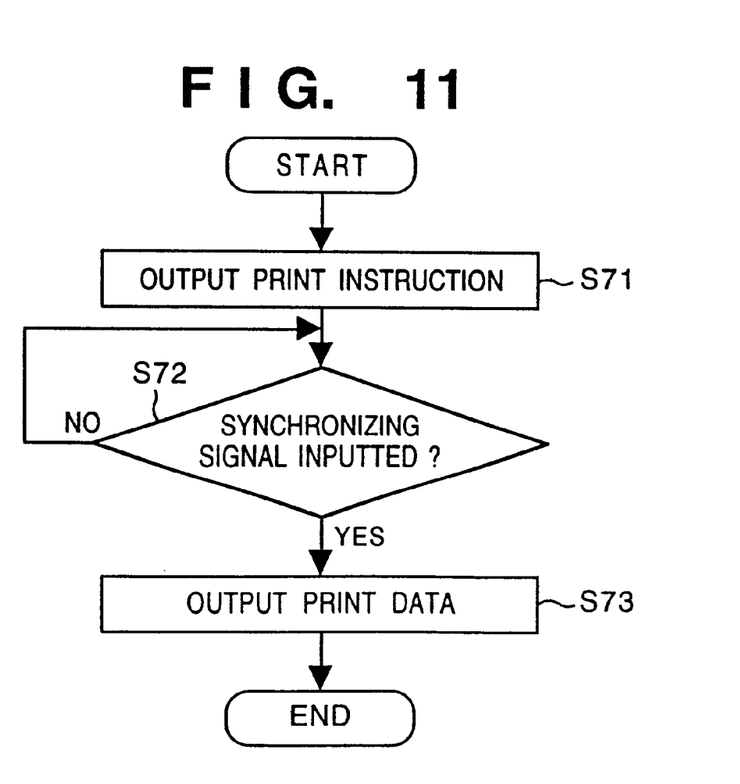
FIG. 11 is a flowchart of an operational sequence of an external device according to the second embodiment.

FIG. 11 is a flowchart of a processing for outputting a print instruction and print data in the external device 9 according to the embodiments.

In print processing, first in step S71, the external device 9 sends a print instruction command to the printing apparatus 1. In response to this command, the processes in steps S2 to S5 shown in the aforesaid flowchart in FIG. 4 are performed. Since the value of the counter 11 becomes non-zero after the above processes are performed, paper feed operation starts in step S22 in FIG. 6 or step S42 in FIG. 8. Then, in step S31 in FIG. 7 or in step S51 in FIG. 9, when the state sensor 7 detects the leading edge of the fed paper, a synchronizing signal is outputted to the external device 9 in step S32 or S53. In response to the synchronizing signal, the process proceeds from the step S72 to step S73 in FIG. 11, and the external device 9 sends print data to the printing apparatus 1. Note, when printing the same image data on a plurality of paper sheets, by repeatedly outputting the same print data in the same processing sequence as described above, plural copies of the same image is obtained. Further, it is possible to obtain plural copies of the same image in the following manner. First, the external device 9 sends print data to the printing apparatus 1 once, then print instructions are transmitted the same number of times as copies of the image to the printing apparatus 1, and the desired number of copies of the same image are printed.

Next, the data processing program readable by the controller unit of the printing apparatus according to an embodiment will be explained with reference to a memory map shown in FIG. 12.

Figure 12:
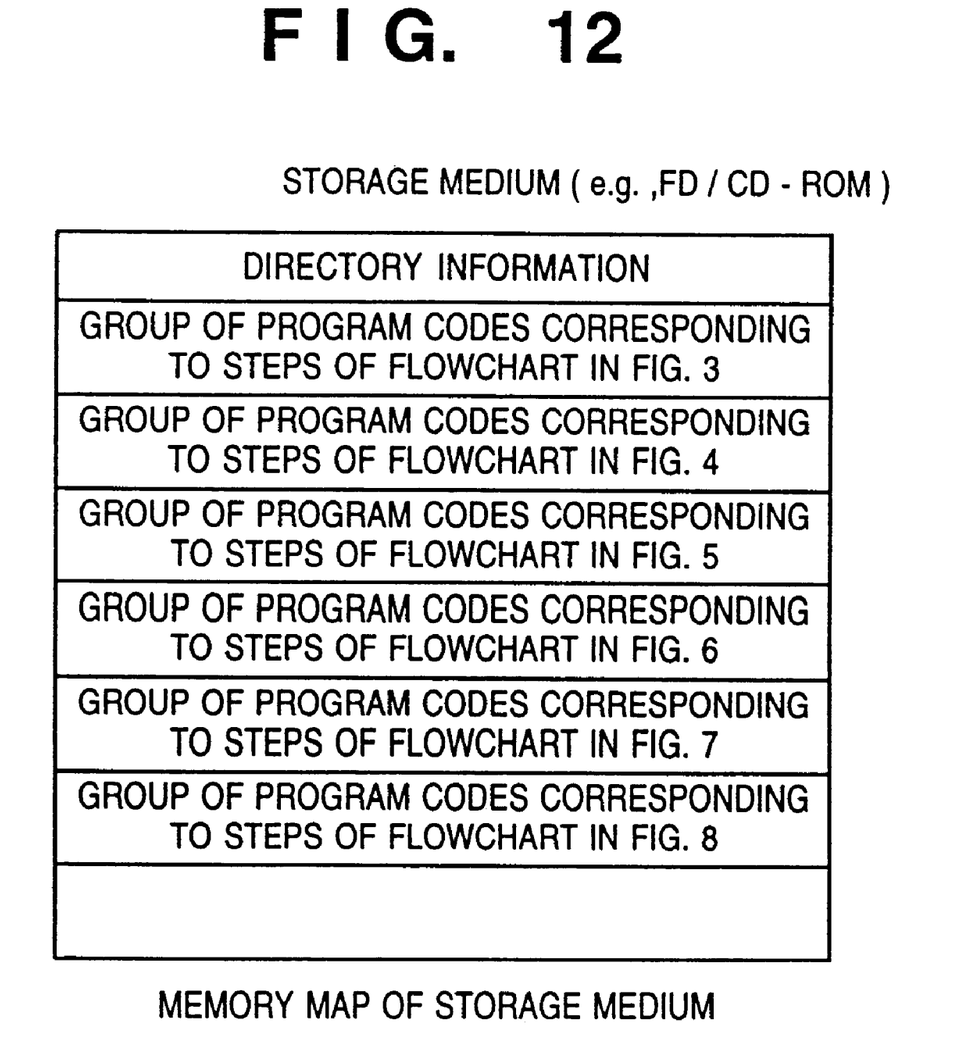
FIG. 12 is a memory map of a storage medium storing a variety of data processing programs readable by the print controller according to an embodiment of the present invention.

FIG. 12 is the memory map of a storage medium storing a variety of data processing programs readable by the controller 2 according to the embodiment.

Note, although it is not shown, information, such as a software version information and author of the program, used for managing a plurality of programs to be stored in a storage medium are also stored, as well as information, such as icons for distinguishing programs, which rely on an operating system of the program reading side is also stored sometimes.

Further, data depending upon each program is also managed by a directory. Furthermore, a program for installing a variety of programs, and, in a case where a program to be installed is compressed, a program for decompressing the compressed program may be also stored.

Programs for realizing the functions shown in the flowcharts in FIGS. 4 to 11 which are installed from outside may be executed by the external device 9. In such case, the present invention also includes a case where groups of information including the programs are provided to an output apparatus from a storage medium, such as a CD-ROM, flush memory, and floppy disk, or from an external storage medium via a network.

The object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions that according to the above embodiments are realized by executing the program codes which are read by a computer, the present invention includes a case where an OS (operating system) or the like working on the computer performs a part of or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part of or the entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

What is claimed is:

1. A print control apparatus for controlling print processing on the basis of a print instruction which requests printing of one page and which is received from an external device, said apparatus comprising:

receipt means for receiving plural different instructions from the external device through a communication interface;

discrimination means for discriminating a print instruction among the plural different instructions received by said receipt means;

counting means for counting the number of print instructions discriminated by said discrimination means; and feed control means for controlling feeding of at least one recording medium in a conveyance path sized to accommodate a plurality of recording media in series, in parallel with print processing of a current page, onto which the print data of a subsequent page is to be printed, on the basis of a value counted by said counting means.

2. The print control apparatus according to claim 1, further comprising:

means for decreasing the value of said counting means in response to the feeding of the recording medium.

3. The print control apparatus according to claim 1, further comprising:

means for decreasing the value of said counting means in response to an instruction inputted from the external device.

4. The print control apparatus according to claim 1, further comprising:

clearing means for clearing the value of said counting means in response to an instruction inputted from the external device.

5. The print control apparatus according to claim 1, further comprising:

accommodation means for accommodating plural types of recording media; and feeding means for selecting a desired type of recording medium accommodated in said accommodation means and feeding the selected recording medium to a printing position of the recording medium.

6. The print control apparatus according to claim 1, further comprising:

detection means for detecting a conveyed recording medium at a predetermined position upstream to a printing position;

signal generation means for generating a signal for requesting transmission of the print data to the external device in response to a detection by said detection means; and means for decreasing the value of said counting means each time said signal generation means generates the signal.

7. The print control apparatus according to claim 1, further comprising:

holding means for holding a plurality of recording media used for printing;

medium detection means for detecting whether or not there is any recording medium on said holding means; and means for clearing the value of said counting means on the basis of a detection result by said medium detection means.

8. The print control apparatus according to claim 1, further comprising:

holding means for holding a plurality of recording media used for printing;

size detection means for detecting a size of a recording medium held by said holding means;

determination means for determining whether or not the size detected by said size detection means is exchanged; and means for clearing the value of said counting means in a case where it is determined by said determination means that said holding means is exchanged.

9. The print control apparatus according to claim 1, further comprising;

notifying means for notifying the value of said counting means to the external device after the value counted by said counting means is decreased or increased.

10. The print control apparatus according to claim 1, further comprising printing means.

11. The print control apparatus according to claim 10, wherein said printing means includes detection means for detecting the recording medium upstream of a printing position.

12. The print control apparatus according to claim 11, further comprising means for decreasing the value of said counting means in response to a detection by said detection means.

13. The print control apparatus according to claim 11, further comprising means for outputting a signal for requesting print data to the external device in response to a detection of said detection means.

14. The print control apparatus according to claim 10, further comprising:

means for detecting a jam of the recording medium, and means for clearing the value of said counting means in response to the detection of the jam.

15. A print control method for controlling print processing on the basis of a print instruction which requests printing of one page and which is received from the external device, said method comprising the steps of:

receiving plural different instructions from the external device through a communication interface;

discriminating a print instruction from the plural different instructions received in said receiving step;

counting the number of print instructions discriminated at said discriminating step; and controlling feeding of at least one recording medium in a conveyance path sized to accommodate a plurality of recording media in series, in parallel with print processing of a current page, onto which the print data of a subsequent page is to be printed, on the basis of a counted value in said counting step.

16. The method according to claim 15, further comprising the step of decreasing the counted value in response to the feeding of the recording medium.

17. The method according to claim 15, further comprising the step of decreasing the counted value in response to an instruction inputted from the external device.

18. The method according to claim 15, further comprising the step of clearing the counted value in response to an instruction inputted from the external device.

19. The method according to claim 15, further comprising the steps of:

accommodating plural types of recording media; and selecting a desired type of recording medium and feeding the selected recording medium to a printing position of the recording medium.

20. The medium according to claim 15, further comprising the steps of:

detecting a conveyed recording medium at a predetermined position upstream of a printing position;

generating a signal for requesting transmission of the print data to the external device in response to a detection in said detecting step; and decreasing the counted value each time the signal is generated.

21. The method according to claim 15, further comprising the steps of:

detecting whether or not there is any recording medium being held for printing; and clearing the counted value on the basis of a detection result in said detecting step.

22. The method according to claim 15, further comprising the steps of:

holding a plurality of recording media used for printing in a holding portion;

detecting a size of a recording medium held in said holding step;

determining whether or nor the size detected in said detecting step is exchanged; and clearing the counted value in a case where it is determined that the holding portion is exchanged.

23. The method according to claim 15, further comprising the step of:

notifying the counted value to an external device after the counted value is decreased or increased.

24. The method according to claim 15, further comprising the step of printing.

25. The method according to claim 24, wherein said printing step includes the step of detecting the recording medium upstream of a printing position.

26. The method according to claim 25, further comprising the step of decreasing the counted value in response to a detection in the detecting step.

27. The method according to claim 25, further comprising a step of outputting a signal for requesting print data to the external device in response to a detection in the detecting step.

28. The method according to claim 24, further comprising the steps of:

detecting a jam of the recording medium, and clearing the counted value in response to the detection of the jam.

* * * * *

UNITED STATES PATENT AND TRADEMARK OFFICE
CERTIFICATE OF CORRECTION

PATENT NO. : 6,359,696 B1
DATED : March 19, 2002
INVENTOR(S) : Kenjiro Hori et al.

It is certified that error appears in the above-identified patent and that said Letters Patent is hereby corrected as shown below:

<u>Title page, Item [54] and Column 1, line 4,</u>
Title, "MEDUIM" should read -- MEDIUM --.

<u>Column 12,</u>
Line 41, "nor" should read -- not --.

Signed and Sealed this

Fourteenth Day of January, 2003

JAMES E. ROGAN
*Director of the United States Patent and Trademark Office*